April 21, 1942.  E. E. VAN CLEAVE  2,280,180
PINION ASSEMBLY FOR HAND BRAKES
Filed June 6, 1940  3 Sheets-Sheet 1
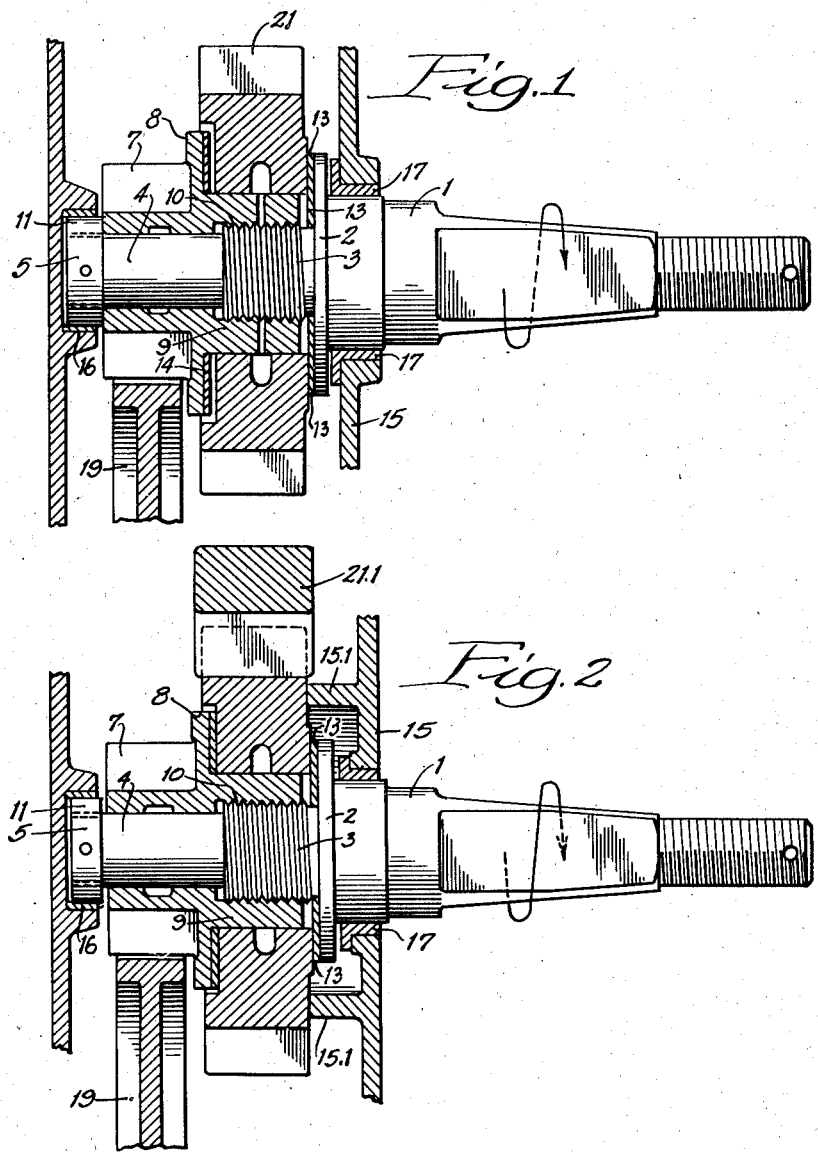
Inventor:
Edwin E. Van Cleave
By Rummler, Rummler & Davis
Attorneys.

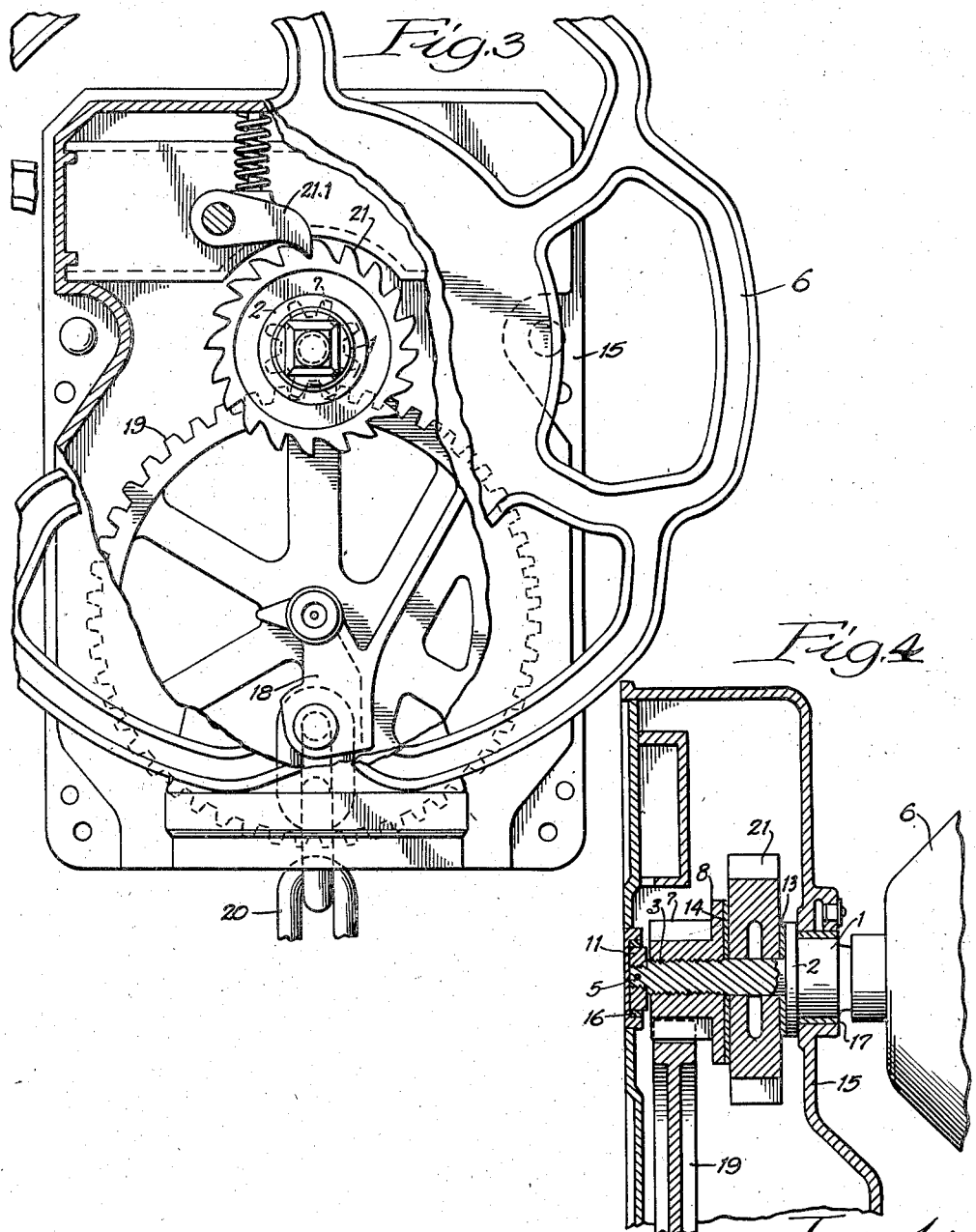

April 21, 1942.    E. E. VAN CLEAVE    2,280,180
PINION ASSEMBLY FOR HAND BRAKES
Filed June 6, 1940    3 Sheets-Sheet 3

Inventor:
Edwin E. Van Cleave,
Rummler, Rummler & Davis
By
Attorneys.

Patented Apr. 21, 1942

2,280,180

UNITED STATES PATENT OFFICE 2,280,180

PINION ASSEMBLY FOR HAND BRAKES

Edwin E. Van Cleave, Chicago, Ill.

Application June 6, 1940, Serial No. 339,092

3 Claims. (Cl. 192—16)

This invention relates to hand-operated brake mechanisms, especially as applied to railway cars and relates particularly to mechanism suitable for operation either at the inside or outside of a car for transmitting rotation from a brake operating hand wheel to a brake drum.

A hand brake of the type for which the improvement is suited is located on the wall of a railway car and includes a drum from which a brake chain leads to brake rigging at the bottom of the car for actuating brake shoes. Brake application is accomplished by winding the chain on the drum, thereby placing the brake shoes against the car wheels, and release simply involves allowing the chain to unwind.

A usual inconvenience of such arrangements is the necessity of manipulating separate devices in operating the brake. A hand wheel is rotated to apply the brake, during which operation the mechanism is held against reverse movement by a ratchet wheel, and another handle is employed in disconnecting the mechanism from the ratchet wheel so that the brakes may release. In many brakes before the ratchet wheel can be disconnected from the mechanism the hand wheel must be additionally rotated forwardly sufficiently to remove brake load pressure from the ratchet. Therefore, the initial power applied to the wheel in effecting release must be greater than that used to apply the brake. Consequently a brake applied by one operator may be impossible for a second operator of less strength to release.

Attention from the operator is necessary to prevent this release operation from being too rapid with consequent damage to the mechanism, slowing of release being generally accomplished by reconnecting the brake with the holding mechanism. Back spinning of the hand wheel during release, which constitutes a danger to the operator is usually prevented by a clutch arrangement that makes forward rotation of the hand wheel effective to turn the drive shaft but leaves the wheel loose with reference to reverse rotation of the shaft; hence, should the mechanism bind against release, the hand wheel is of no use in forcing reverse rotation of the mechanism. Moreover, an accident to the clutch may place the brake out of control.

In brakes having two hand wheels for operation from both the inside and outside of a car these drawbacks are particularly marked, due to needed complications. Further inconvenience in control of brakes of this character results from the requirement that one of the hand wheels be always rotated in a direction opposite to that customary.

The objects of this invention are to provide improved and simplified mechanism as described, arranged to automatically prevent too abrupt release of a brake; to materially lessen the power requirements for effecting release with reference to those needed for application; to obviate back spinning during release; to make release of the brake impossible except while the wheel is manually rotated backward; to permit a forced release of the brake in case of binding of the mechanism during release; to provide such a brake wherein the brake has no other controls than the hand wheel and is always completely controlled thereby; and to provide these characteristics in a brake otherwise rotated as usual and held from reverse rotation by a ratchet means.

A further object is to incorporate these features into a hand brake operated from either the inside or outside of a car and to provide a brake of this character permitting, if desired, brake application by initial rotation of the hand wheel in either direction.

Specific constructions embodying these improvements are illustrated by the accompanying drawings, wherein:

Figure 1 is a central longitudinal section of a hand brake drive-shaft and pinion in threaded cooperation, showing a ratchet wheel out of clutch relationship between the pinion and a shaft shoulder. The pinion operates a brake drum, which is not shown.

Fig. 2 shows a device like that of Fig. 1 but with ratchet clutched and includes a stop member on the housing for insuring clearance between a shoulder on the shaft and the housing.

Fig. 3 is a face view of the device of Fig. 1 assembled in a casing with parts of the casing and hand wheel shown broken away.

Fig. 4 is a fragmentary sesctional side elevation of Fig. 3.

Figure 5:
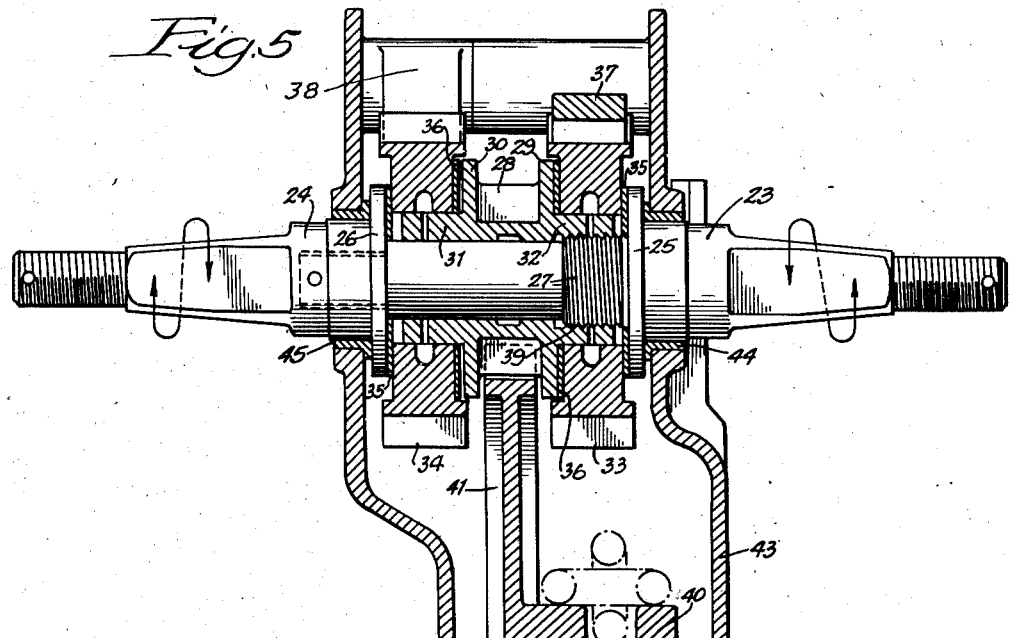
Fig. 5 shows a modification of the arrangement of Fig. 1, wherein the drive shaft is arranged to carry two hand wheels so that the pinion may be operated from either side.

The arrangement includes a shouldered drive shaft and pinion in cooperative threaded engagement. A ratchet wheel is journalled between the shaft shoulder and the pinion. Forward rotation of the shaft or rearward rotation of the pinion draws the shoulder and pinion toward each other, thereby clutching the ratchet.

This action is utilized in a manner to be presently described.

Referring to Fig. 1 of the drawings, the drive shaft 1 is flanged at 2, reduced in size and threaded at 3, again reduced in size at 4, and threaded at 5. A hand wheel 6 for the shaft is indicated in Fig. 3.

A pinion 7 has a shoulder or flange 8 and a hub 9 which is interiorly threaded at 10. The pinion is journalled on shaft portion 4; pinion hub 9 is screwed over thread 3 and a clutching shoulder or collar 11 is screwed over thread 5. A holding device which in this case is a ratchet wheel 21 fits loosely on the hub, composition spacers 13 and 14 being carried between the ratchet wheel and the flanges. The pinion hub 9 is not essential and may be dispensed with by threading the shaft directly into the pinion as shown in Fig. 4. A casing 15 for the mechanism journals the collar 11 at 16 and a portion of the shaft at 17.

The other elements of a railway car hand brake are not fully illustrated but as usual, include a pawl 21.1 for the ratchet wheel, a brake drum 18 (Fig. 3) and a gear 19 fast thereto. Pinion 7 meshes with the gear and a chain 20 leads from the drum to brake rigging.

In applying the brake the hand wheel is rotated to the right, thereby producing a screw action between the threads of pinion 7 and shaft 1. This draws flanges 8 and 2 toward each other until the ratchet wheel is clutched between the flanges, when the shaft and pinion rotate as a unit to revolve the brake drum. The ratchet wheel is rotated with these elements and of course, functions as usual to prevent reverse rotation.

To release the brake the hand wheel is rotated to the left, thereby moving the shaft and pinion flanges away from the ratchet. This leaves the pinion free to rotate backwardly under pull from the brake load. The backward rotation of the pinion, however, immediately screws the shaft and pinion flanges into clutch relation with the ratchet which prevents further reverse rotation. To continue release of the brake, the wheel must be further oppositely rotated to release the pinion from the ratchet, causing a repetition of the process.

Any tendency of the entire unit to move to the right of Fig. 1 might cause jamming of shaft flange 2 between ratchet wheel 21 and the housing bearing 17. This would add needless difficulty to the release of the brake due to friction between these contacting surfaces. To obviate this an abutment or flange 15.1 may be formed on the housing (Fig. 2). The flange abuts the ratchet wheel, thereby preventing the pinion 7 from pushing the shaft flange 2 into clutch engagement with the housing bearing 17.

Easy release of the brake is further facilitated by the small diameter of spacer 13 relative to spacer 14. While the unit is in clutch engagement pressure is concentrated on spacer 13 but distributed on spacer 14. Consequently, reverse rotation of the hand wheel releases shaft flange 2 from the ratchet wheel in advance of the pinion release. This allows an easier release than would be possible were the spacers of equal size or were spacer 13 larger than spacer 14.

Figure 6:
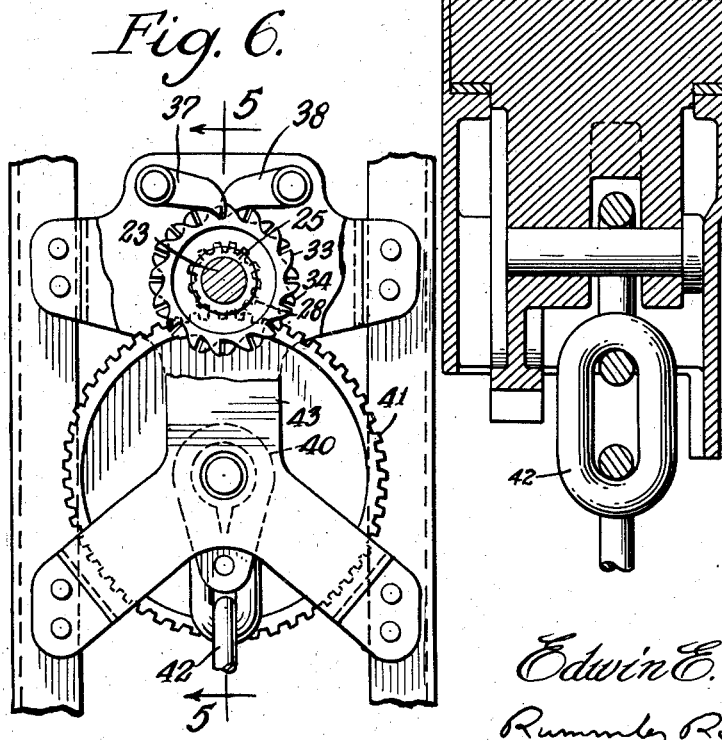
Fig. 6 is a face view of the device of Fig. 3.

Should pull from the brake load for any reason fail to effect release, the hand wheel may be reversely rotated until the pinion is clutched by collar 11, which will cause the shaft and pinion to turn as a unit and positively force reverse or unwinding rotation of the pinion.

Where it is desirable that the brake be operable from either the outside or inside of a car, the modification shown in Figs. 5 and 6 is employed. This mechanism is carried between the double walls 22 at the end of the car. The construction is similar to the one just described except that a pair of oppositely disposed ratchet wheels is employed. The ratchet wheels are separately clutchable to the pinion and shaft according to the direction of shaft rotation.

In this case drive shaft 23 carries a hand wheel 23.1 at each end and is made in two parts, threaded and pinned together at 24. Flanges 25 and 26 are formed on the shaft, which is threaded between the flanges at 27.

A pinion 28 formed with flanges 29 and 30 and hubs 31 and 32 is journalled on shaft 22 between flanges 25 and 26. Ratchet wheels 33 and 34 with oppositely formed teeth are loosely journalled on the pinion hubs and composition spacers 35 and 36 are carried at each side of the ratchet wheels. Ratchet pawls are designated at 37 and 38.

Axial movement of the pinion is provided by threading hub 32 at 39 to cooperate with shaft threading 27. The mechanism described actuates a brake drum 40 fast with a gear 41 which meshes with pinion 28. The drum is constructed to allow either right or left hand winding of the brake chain 42. A casing 43 for the mechanism journals shaft 22 at 44 and 45.

In the operation of this construction, which resembles that of the arrangement of Fig. 1, right hand rotation of one hand wheel is equivalent to the left hand rotation of the other, since both hand wheels are affixed to the same shaft. Consequently when the brake is fully released application may be by rotation of either hand wheel in either direction.

To apply the brakes from outside the car, for instance, the hand wheel may be initially rotated in either direction. However, should rotation be to the right, as customary, pinion 29 is drawn to the right, as shown in Fig. 5, the ratchet 33 is clutched between shaft flange 25 and pinion flange 29. This movement clears the pinion from ratchet 34, which consequently offers no interference to right-hand rotation of the shaft.

Further take-up of the brake may be accomplished from the inside of the car but in this instance the inside wheel must be rotated to the left.

Release of the brake, when outside application has been to the right, is accomplished from the outside of the car by rotating the hand wheel to the left or from the inside of the car by right-hand rotation. This unclutches pinion flange 29 from ratchet 33, allowing the pinion reverse rotation under pull from the brake load until reclutched to ratchet 33 in the same way as in the construction of Fig. 1. Pinion 28 is prevented from moving against ratchet 34 during release by the brake load pressure.

Application of the brake from the inside is the same as application from the outside, except that in the case of right-hand rotation of the hand wheel ratchet wheel 34 is clutched instead of ratchet 33.

By centralizing complete control of the brake in the hand wheel, the arrangement described accomplishes all the functions of customary hand brakes without the inconvenience attendant upon operation of separate application and release means, thereby providing a high degree of safety besides eliminating the structural complications of separate ratchet release devices.

The power requirements for releasing the brake are approximately half those needed in applying the brake.

I claim:

1. A device of the character described including a pinion, a shaft passing through and in threaded engagement with the pinion, the shaft having a shoulder facing the pinion, a one-way holding device loosely and concentrically supported between the shaft shoulder and the pinion, means for effecting relative rotation between the shaft and pinion to axially move the shaft shoulder and pinion toward and away from clutch engagement with the holding device, a collar on the shaft in position to be engaged by the pinion and form a driving connection between the shaft and pinion when the pinion is disengaged from the holding device, said collar being both threaded and pinned to the shaft, and a bearing surrounding the collar.

2. A device of the character described including a pinion, a shaft passing through and in threaded engagement with the pinion, the shaft having a shoulder facing the pinion, a one-way holding device loosely and concentrically supported between the shaft shoulder and the pinion, a pair of spacers one at each side of the holding device, the spacer adjacent the shaft shoulder having substantially less effective frictional engaging surface than the other spacer, and means for effective relative rotation between the shaft and pinion to axially move the shaft shoulder toward and away from clutch engagement with the pinion shoulder.

3. A device of the character described including a pinion, a shaft passing through and in threaded engagement with the pinion, the shaft having a shoulder facing the pinion, a support for the shaft including a bearing on the outer side of the shaft shoulder, a one-way holding device loosely and concentrically supported between the shaft shoulder and the pinion, the support bearing having an abutment in contact with the holding device, and means for effecting relative rotation between the shaft and pinion to axially move the shaft shoulder and pinion toward and away from clutch engagement with the holding device.

EDWIN E. VAN CLEAVE.